UNITED STATES PATENT OFFICE.

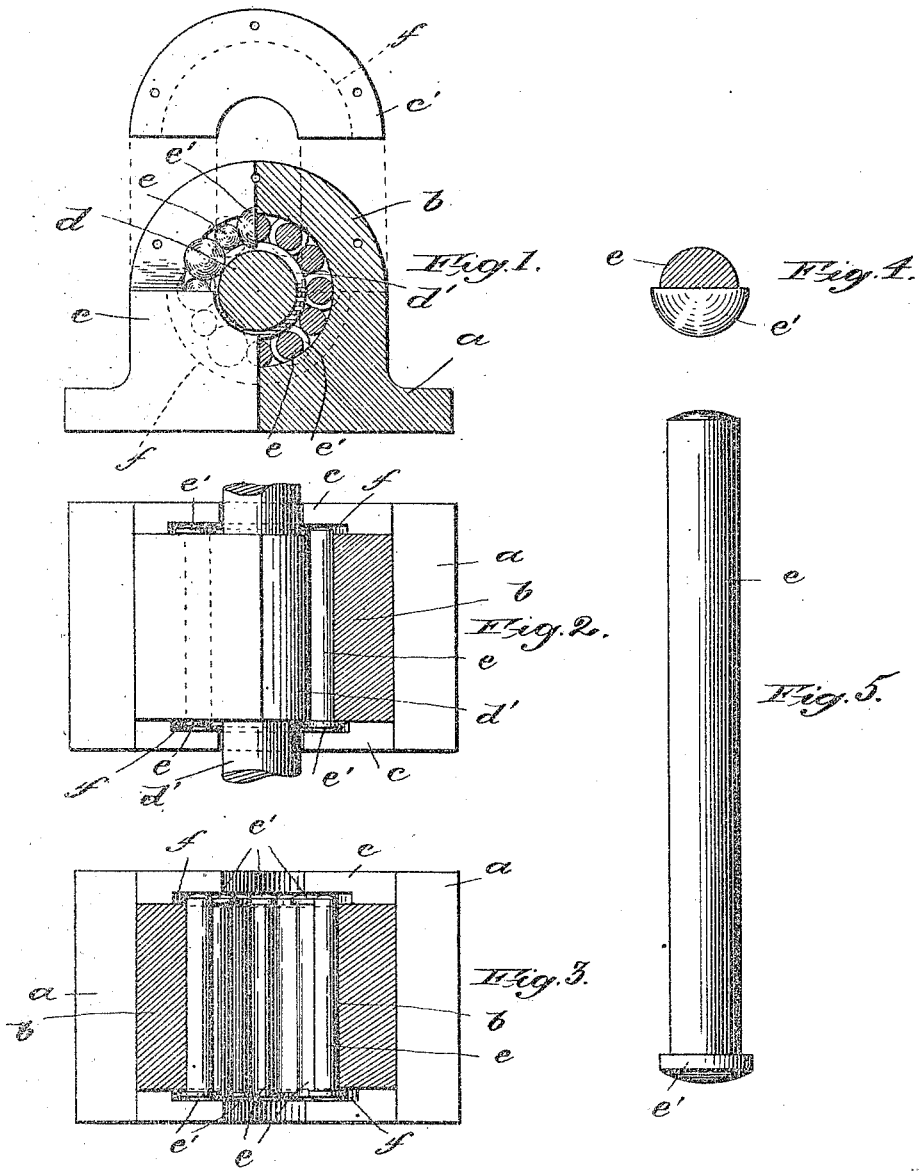

JOSEPH S. H. HOLMES, OF DRIFTON, PENNSYLVANIA.

DIFFERENTIAL ROLLER-BEARING.

SPECIFICATION forming part of Letters Patent No. 533,357, dated January 29, 1895.

Application filed December 9, 1893. Serial No. 493,235. (No model.)

*To all whom it may concern:*

Be it known that I, JOSEPH S. H. HOLMES, a citizen of the United States, residing at Drifton, in the county of Luzerne and State of Pennsylvania, have invented a new and useful Differential Roller-Bearing, of which the following is a specification.

My invention relates to journal bearings and more particularly to the class of journal bearings known as "roller bearings," in which a rolling medium is interposed between the shaft and the box of the bearing so that the friction between the journal and its seat is reduced to a minimum.

It is with the object of improving this class of bearings and providing a device in which there shall be the least possible frictional contact between the journal and its seat that I have invented the bearing which I will describe in detail hereinafter.

In carrying out my invention I have had due regard for simplicity in construction and cheapness in production, and have endeavored to provide a bearing which shall have the least number of parts consistent with efficiency in operation, with such parts arranged so as to give compactness to the entire bearing and to allow the ready assemblage of the different members.

In the drawings, Figure 1 is an end view of my improved bearing, a portion of the same being in section to more clearly show the relative positions of the shaft and rollers. Fig. 2 is a plan view partially in section. Fig. 3 is a horizontal sectional view with the shaft removed showing the disposition of the rollers in the box. Figs. 4 and 5 are enlarged detail views of one of the rollers.

The journal box comprises the base $a$ having the housing $b$ formed integral therewith, and said base is provided with the lower half end plates $c$, which I preferably form integral with said base and housing. Through said housing is formed an aperture which is considerably larger than the shaft to be seated therein. Bolted or otherwise secured to the upper part of said housing $b$ and seated upon the tops of the lower half end plates $c$ are removable upper half end plates $c'$, one of which is shown in raised position in Fig. 1.

The parts thus far mentioned, when assembled, form the box of the bearing in which the shaft and its bearing rollers are mounted in the manner which I shall now describe.

The shaft $d$ is provided with an enlarged portion $d'$ as clearly shown in Figs. 1 and 2, which enlargement forms the bearing portion of the shaft and is seated within the box. Between the enlarged bearing portion $d'$ and the inner wall of the box are placed a series of rollers $e$ which completely surround the shaft enlargement $d'$ and form a rolling medium between it and the inner wall or central bearing portion of the box. Said rollers $e$ are provided at one end with heads $e'$ formed integral therewith. The end plates $c$ and $c'$ have recesses $f$ on their inner faces so that the heads $e'$ of the rollers $e$ lie in said recesses and out of contact with the inner wall of the box. These heads $e'$ act as separators for the rollers $e$ since they bear against the bodies of the adjacent rollers and separate the series of rollers one from another throughout the greater portion of their lengths. The said rollers are disposed with their heads $e'$ alternating and so arranged relatively to the enlarged portion $d'$ of the shaft $d$ as that said enlargement lies just between the said alternating heads and in contact with the bodies of the rollers, as is more clearly shown in Figs. 2 and 3. These rollers $e$ are convexed at both ends as shown so as to render the friction in case of end thrust very slight.

From the foregoing it is apparent that when the several parts of the bearing are assembled the enlarged bearing portion $d'$ of the shaft $d$ is in contact with the body portions of the rollers $e$, which body portions in turn bear against the inner wall or central bearing portion of the box. The convexed heads of the rollers $e$ being seated within the recesses $f$ in the end plates $c$, $c'$ are out of contact with the shaft $d$ and the inner wall of the housing $b$, but said heads $e'$ bearing against the headless ends of the adjacent rollers keep said rollers $e$ apart so as that they are in contact only throughout a minor portion of their lengths and thus reduce the friction between the said rollers.

Having thus described my invention, I claim and desire to secure by Letters Patent—

1. A journal bearing comprising a housing provided with a shaft aperture, and series of headed rollers arranged in said aperture so as that their bodies bear against the shaft and the inner wall of the housing while the heads of said rollers bear against the adjacent rollers and keep the series separated one from another throughout the major portions of their lengths.

2. A journal bearing comprising a housing provided with a shaft aperture, recessed end plates, and series of headed rollers arranged in said aperture so as that their bodies bear against the shaft and the inner wall of the housing while the heads of said rollers bear against the adjacent rollers and keep the series separated one from another throughout the major portion of their lengths, substantially as described.

3. In combination with a shaft having an enlargement thereon, a journal-bearing comprising recessed end plates, a housing, and single headed rollers having their heads arranged alternatingly in the recesses and so as to engage the ends of the shaft enlargement, substantially as described.

4. In combination with a shaft having an enlargement thereon, a journal bearing comprising recessed end plates, a housing, and single headed rollers having their heads arranged alternately in the recesses and so as to engage the ends of the shaft enlargement, the extremities of said rollers being convexed, substantially as described.

5. The combination with a journal box comprising a housing provided with a central bearing portion and having recesses on either side thereof, of a shaft mounted therein and a series of single headed rollers arranged between the shaft and said central bearing portion so as that their bodies form a rolling bearing for said shaft while their heads lie within the recesses on either side of said bearing portion, substantially as described.

6. In combination with a shaft having an enlarged bearing portion, a journal box comprising a housing provided with a central bearing portion and having recesses on either side thereof, series of single headed rollers arranged so as that their bodies form a rolling medium between said shaft enlargement and the central bearing portion of the housing while the heads of said rollers lie within said recesses and out of contact with said shaft and housing, substantially as described.

J. S. H. HOLMES.

Witnesses:
THOMAS BIRKBECK,
CHAS. SEESHOLTZ.